United States Patent [19]
Barber

[11] Patent Number: 5,769,701
[45] Date of Patent: Jun. 23, 1998

[54] HAIR SINGEING APPARATUS FOR ANIMALS

[75] Inventor: Clyde E. Barber, Green Cove Springs, Fla.

[73] Assignee: Dry Enterprises, Inc., Green Cove Springs, Fla.

[21] Appl. No.: 736,347

[22] Filed: Oct. 23, 1996

[51] Int. Cl.$^6$ ............................................. A22B 5/08
[52] U.S. Cl. ..................................................... 452/73
[58] Field of Search ............................. 452/73, 71

[56] References Cited

U.S. PATENT DOCUMENTS

| | | | |
|---|---|---|---|
| 84,983 | 12/1868 | Alexander | 452/73 |
| 222,654 | 12/1879 | Boyd | 452/73 |
| 4,653,148 | 3/1987 | Getz | 452/73 |

FOREIGN PATENT DOCUMENTS

| | | | |
|---|---|---|---|
| 1020011 | 1/1953 | France | 452/73 |
| 03138 | 10/1869 | United Kingdom | 452/73 |

*Primary Examiner*—Willis Little
*Attorney, Agent, or Firm*—Arthur G. Yeager

[57] ABSTRACT

An apparatus for singeing the udder hair of dairy animals, the apparatus comprising a tank of liquid propane gas, a long pipe with an alignment of spaced holes to emit the gas to burn in the shape of a long thin vertical sheet flame, flexible hose connecting the tank exit to the burner pipe, and suitable controls such as a metering orifice, a gas pressure regulator, and an on-off valve. This apparatus may be combined into a convenient movable kit in which all of the above equipment is in a small compact wheeled container having a guiding handle and also preferably including an insulated fire retardant mitten and a spark generator for igniting the gas exiting the holes in the pipe.

19 Claims, 4 Drawing Sheets

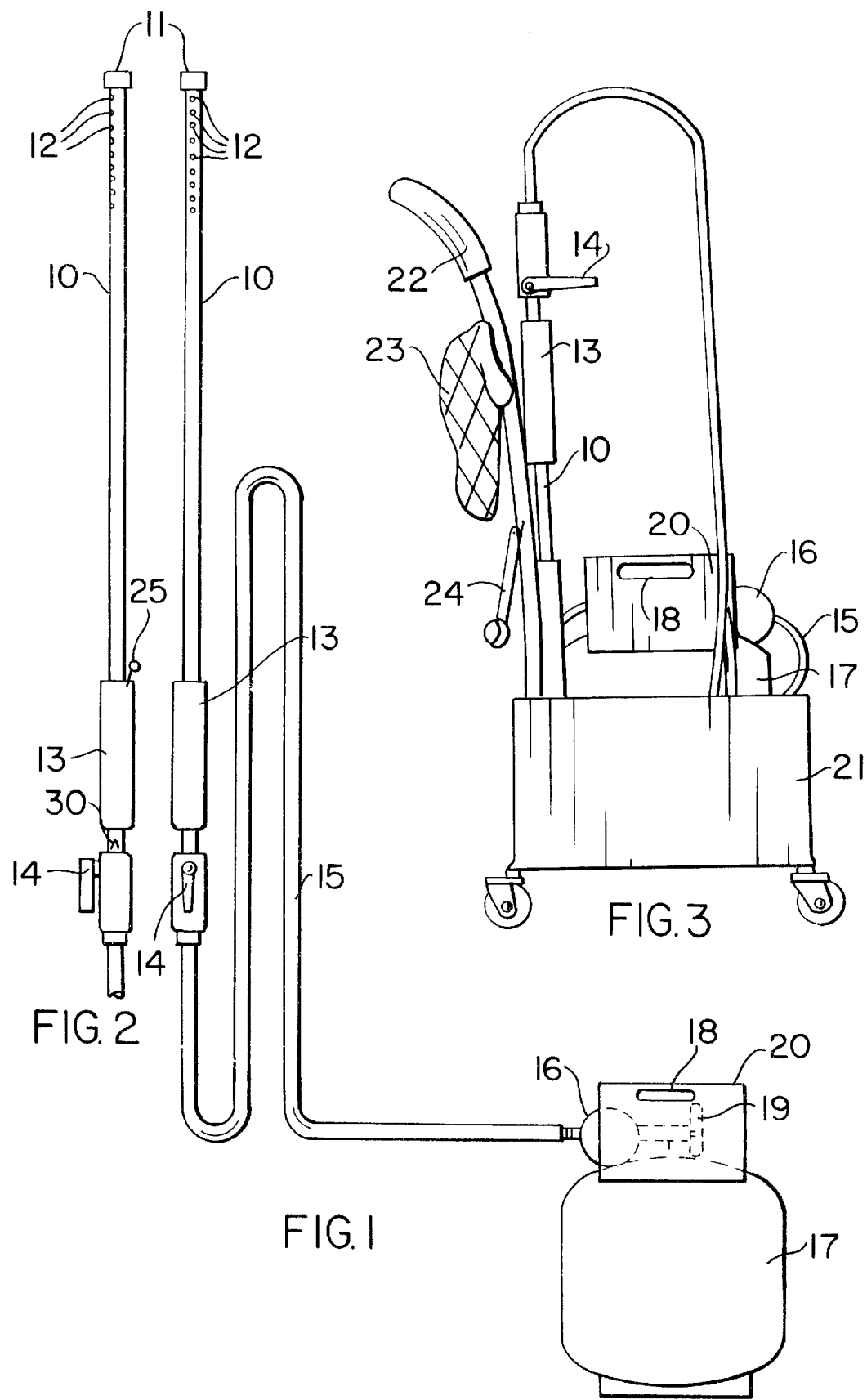

HAIR SINGEING APPARATUS FOR ANIMALS

TECHNICAL FIELD

This invention relates to hair-singeing apparatus, especially constructed for singeing hair on the udders of dairy animals, including cows, goats, sheep and grooming of animals for show or auction.

BACKGROUND OF THE INVENTION

In a modern dairy, large numbers of cattle are milked daily by machine; and sanitary requirements must be maintained to satisfy public health officials. Stalls must be kept reasonably clean so as to assure that the milk is not contaminated by those contaminants that are not removed or neutralized by subsequent processing and pasteurization. Among such contaminants is hair from the cattle, especially hair from the udder and the tail that carry bacteria, manure, dirt and mud that cling to long hairs.

It is an object of this invention to eliminate as much as possible of the animal hair and the other contaminants that might have been collected along with the milk. It is still another object of this invention to provide apparatus that may be used quickly and harmlessly to remove excess hair from the animal's udder and tail or to groom other places on the animal. Still other objects will become apparent from the more detailed description which follows.

BRIEF DESCRIPTION OF THE INVENTION

This invention relates to a portable apparatus that includes a specialized gas burner, especially a propane gas burner, that can be adjusted so that a fan-shaped or vertical sheet flame that is not too hot can be quickly moved past a cow's udder and, if necessary, its tail, to burn off stray hair without burning the cow's skin, and thereby eliminate to a large extent the possibility of bacteria contamination carried by the long hair and deposited in the collected milk. The apparatus employs a long hollow pipe pierced with a series of spaced holes along its longitudinal axis to function as the burner that can be held by hand, a flexible tube to connect the wand/burner to a tank of liquid propane gas, and the necessary valves and controls to turn the flow of gas on and off, and to control its pressure. The apparatus is conveniently carried in a wheeled container that may be quickly and easily moved from place to place, and also carry a thermal mitten to brush up matted hair, whisk away singed hair and to hold the tail away from the animal while singeing same, and a spark producer to light the gas when starting. Generally such a container has a handle like a wagon tongue for easy maneuverability of the carrier.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is an illustration of the burner apparatus of this invention, shown as a front elevation thereof;

FIG. 2 is a side view in elevation showing the burner/wand and the shut off valve;

FIG. 3 is a side elevational view of the burner apparatus of FIG. 1 mounted in a wheeled carrier for easy transportation in the milking area, for example;

DETAILED DESCRIPTION OF THE INVENTION

Figure 4:
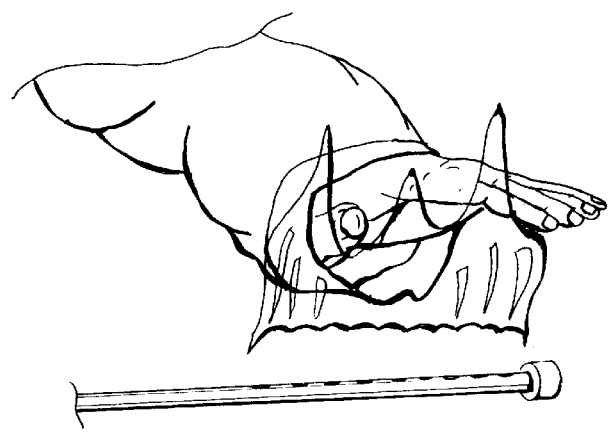
FIG. 4 illustrates the planar flame with an operator's hand therein.

The invention is best understood by reference to the attached drawings where similar parts are numbered the same in each figure.

The apparatus includes a burner/wand 10 which is a hollow pipe pierced by a plurality of spaced and substantially aligned holes 12 along the longitudinal axis of an end portion of pipe 10 that serves as a burner for gas travelling through the hollow of the pipe 10 and exiting through burner holes 12. A planar or vertical sheet like flame is produced by the gas emitted from such holes 12 when ignited to produce a very low temperature flame. It is to be noted that the planar sheet-like flame produced above the holes 12 provides a very low temperature flame due to the prevention of inducted air prior to exiting out the holes 12. The flame may be about seven inches above the holes 12 and some light to twelve inches wide.

A cap 11 closes the end of the hollow in burner/wand 10. At the other end of burner/wand 10 there may be a heat-resistant handle 13 for convenient gripping, and a fuel metering orifice 30 which only permits a predetermined amount of gas to flow to the holes 12 with the valve 14 opened fully. The wand 10 is operatively connected to shut off valve 14, flexible tubing 15, a gas pressure regulator 16 and an exit valve 19 connected to gas tank 17 which contains liquid propane gas. Tank 17 normally includes handholds 18 for moving tank 17, and are located in protection ring or shield 20, which protects regulator 16 and valve 19 from accidental damage. A clean out probe 25 having an abrasive tip (not shown) is detachable secured to handle 13 to be used to maintain the holes 12 clean and fully open.

For convenience in transportation from animal to animal and to storage, the above equipment may be assembled into a wheeled dolly 21 which will easily hold tank 17 and its valve and regulator, flexible hose 15, shut off valve 14 and burner/wand 10 with its handle 13, if any. Other handy articles to include are a thermally insulated, non-inflammable glove 23 and a spark producer 24 to light the liquid propane gas when required. It is convenient to have a handle 22 with which to propel and direct the movement of dolly 21 which carries all of the equipment.

Other items may be included in dolly 21 as wanted by the operator, for example, a shield or restraint to prevent the a tail of an animal from being in the way of the operation being performed to singe unwanted hair.

It is to be noted that other low pressure burnable gas that produces a low temperature flame may be usable, it being understood that modifications to the system will likely be required in at least the orifice 30 and perhaps the pressure regulator 16.

Figure 5:
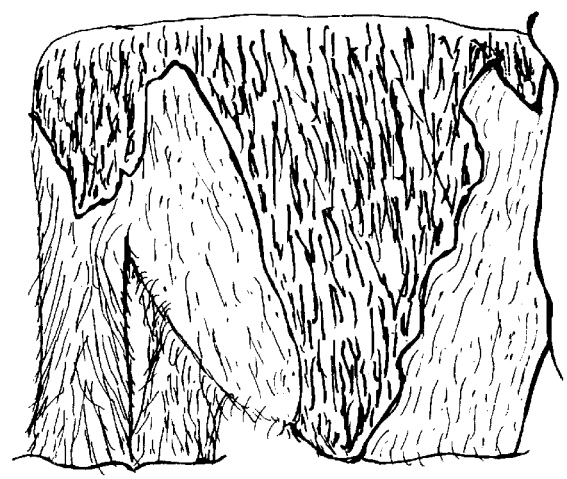
FIG. 5 illustrates a cow's tail with long hairs.
Figure 6:
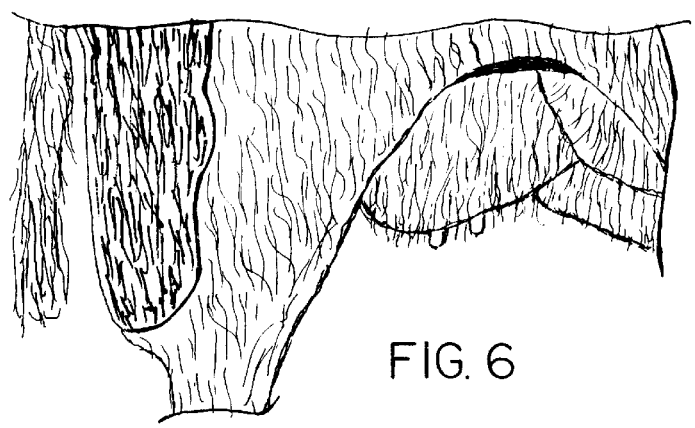
FIG. 6 illustrates a cow's udder with long hairs.
Figure 7:
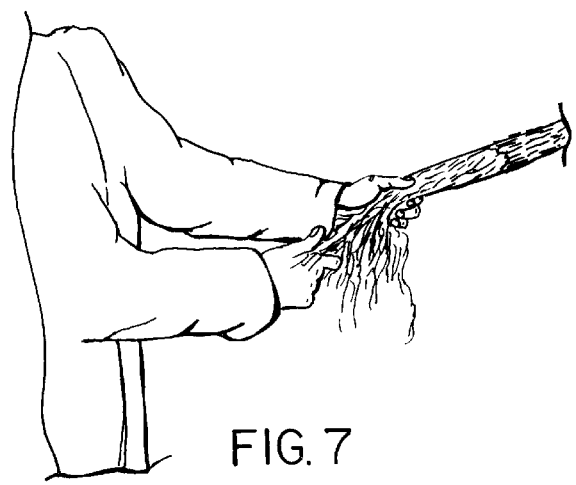
FIG. 7 shows an operator separating the hairs on the cow's tail.
Figure 8:
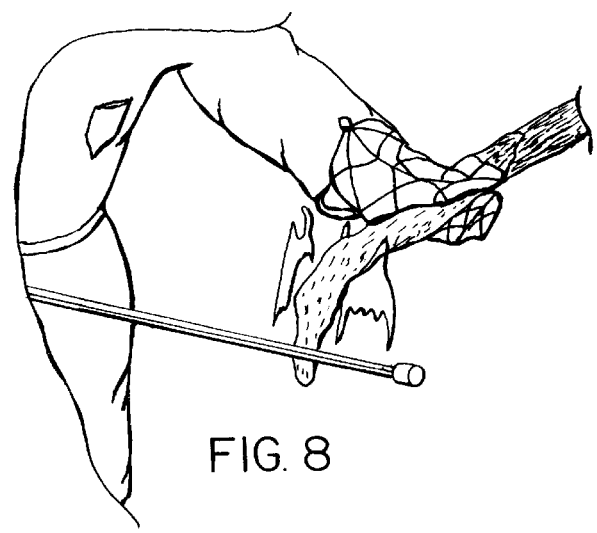
FIG. 8 shows the mitten gripping the tail spaced upward from the end portion being singed.
Figure 9:
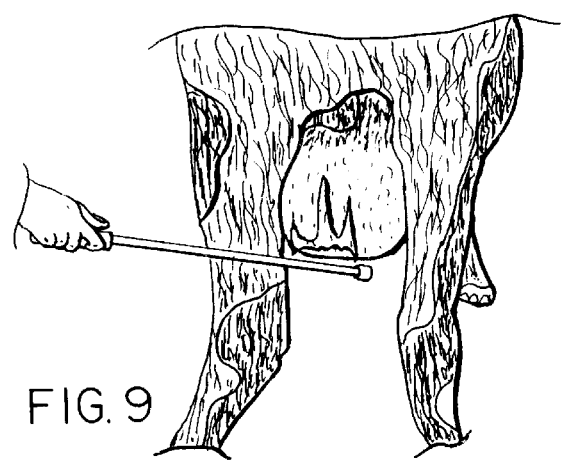
FIG. 9 is a rear view showing singeing of the udder.
Figure 10:
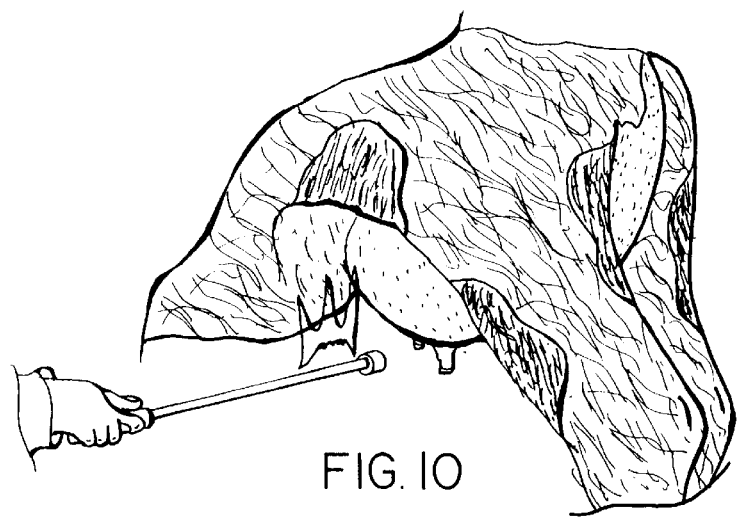
FIG. 10 shows a side view of the udder being singed.
Figure 11:
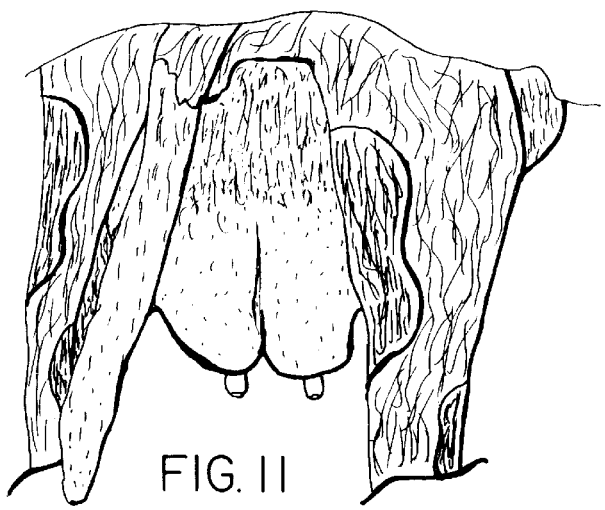
FIG. 11 illustrates a rear view of the singed tail and udder of the cow.
Figure 12:
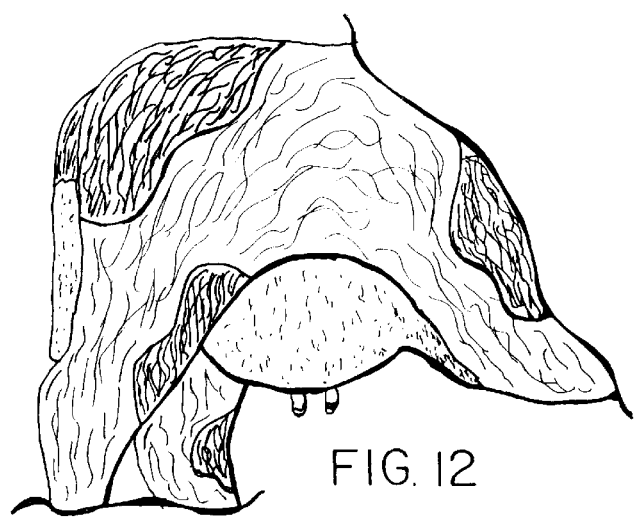
FIG. 12 illustrates a side view of the singed udder and tail of the cow.

The invention herein is more readily understood and appreciated by considering the depictions of FIGS. 4–12 which are line drawings of photographs originally submitted. FIG. 4 shows a planar or sheet like flame produced by the singeing apparatus with an operator's hand therein. FIGS. 5 and 6 represent respectively a cow's tail and udder with long hairs on each. FIG. 7 shows an operator separating the hairs on a cow's tail and FIG. 8 shows the operator's mitten gripping the tail spaced upward from its end portion and being singed by the apparatus of this invention. FIG. 9 depicts the rear view of singeing of the udder while FIG. 10 depicts a side view singeing of the udder. FIG. 11 illustrates a rear view of the singed tail and udder and FIG. 12 shows the side view of the same.

While the invention has described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A hair singeing apparatus for cow's udder and tail comprising an elongated inflexible pipe having opposite end portions and a hollow therebetween, an elongated flexible hose having opposite end portions, one of said end portions of said pipe being conductively connected to one of said end portions of said hose, another said end portion of said hose adapted for conductive connection to a source of low pressure burnable gas, said one end portion of said pipe including an insulated handle and a selectively controllable valve for opening and closing said hollow in said pipe, said other end portion of said pipe including a closure cap sealing off said hollow and being pierced by a plurality of openings adapted to conduct gas from said hollow to outside of said pipe, said openings being generally arranged in alignment lengthwise of said pipe so as to produce a planar flame when ignited.

2. The apparatus of claim 1 further comprising a gas pressure regulator connected to and between said flexible hose and adapted to be connected to a source of liquid propane gas.

3. The apparatus of claim 2 further comprising a gas metering orifice between said valve and said pipe.

4. The apparatus of claim 3 wherein each space between adjacent openings is substantially equal.

5. The apparatus of claim 4 further comprising a movable dolly for carrying said tank, regulator hose, and pipe.

6. The apparatus of claim 5 further comprising an upright handle for moving said dolly by a user thereof.

7. The apparatus of claim 5 further comprising a spark generator for lighting burnable gas exiting said openings.

8. The apparatus of claim 5 further comprising a flame resistant glove for a user's hand to brush away burned hair of an animal being singed with said apparatus.

9. The apparatus of claim 1 wherein said openings are in alignment.

10. The apparatus of claim 1 wherein said openings are equal in size.

11. The apparatus of claim 10 further comprising a gas pressure regulator connected to and between said flexible hose and adapted to be connected to a source of liquid propane gas.

12. The apparatus of claim 11 further comprising a portable liquid propane gas tank, a movable dolly for carrying said tank, regulator, hose, and pipe.

13. The apparatus of claim 12 further comprising an upright handle for moving said dolly by a user thereof.

14. The apparatus of claim 13 further comprising a spark generator for lighting propane gas exiting said openings.

15. The apparatus of claim 14 further comprising a flame resistant mitten for a user's hand to brush away burning hair animal being singed with said apparatus and to hold a tail away from a body of an animal during singeing thereof.

16. The apparatus of claim 1 further comprising a source of liquid propane gas and a gas pressure regulator.

17. The apparatus of claim 16 further comprising a movable dolly for carrying said source, regulator, hose and pipe.

18. The apparatus of claim 17 further comprising an upright handle for moving said dolly by a user thereof.

19. A movable apparatus for undertaking hair singeing of an animal's udder comprising an elongated hollow pipe having opposite end portions, one said end portion being plugged and having pierced aligned spaced openings through a wall of said pipe and another said end portion having a handle and being connected to a flexible hose adapted to be operatively connected via an on-off valve to a source of liquid propane gas via a gas pressure regulator, a gas metering orifice between said on-off valve and said pipe, an exit valve between said source and said flexible hose, and a wheeled dolly to carry same from animal to animal.

* * * * *